Aug. 5, 1952     W. H. ROLOFF     2,606,075

DETACHABLE BALLAST FOR TRACTION WHEELS

Filed July 15, 1949

INVENTOR.
WALTER H. ROLOFF
BY John W. Michael
ATTORNEY.

Patented Aug. 5, 1952

2,606,075

UNITED STATES PATENT OFFICE 2,606,075

DETACHABLE BALLAST FOR TRACTION WHEELS

Walter H. Roloff, Kaukauna, Wis.

Application July 15, 1949, Serial No. 104,845

4 Claims. (Cl. 301—41)

This invention relates to improvements in motor-vehicles and particularly to detachable ballast for the traction wheels of farm tractors and the like.

The present practice is to load the tires with a liquid ballast. Such ballast is damaging to the tires, is lost when a tire blows, is expensive and hard to replace, and does not evenly balance the wheel.

It is an object of this invention, therefore, to provide a traction wheel ballast which will evenly balance the traction wheel, can be readily installed and removed, will not be damaged or lost by tire injuries or blow-outs, and is comparatively inexpensive to manufacture.

This object is obtained by providing segmental weights which are individually installed within the confines of the demountable rim of the traction wheel to form a rigid ring of ballast. The weights are compressed together by wedge-like lugs reacting between the rim and the segments, thus rigidly holding the ring together and also securing it as a unit to said rim and the traction wheel. The lugs are held by special length bolts and nuts which pass through the wheel and rim openings used by the standard rim bolts. While each segment may be small enough so that it may be readily handled and installed, the combined mass of the completed ring will be sufficient to provide the necessary traction. Since the completed ring is rigid and of uniform cross-sectional shape, the weight thereof is evenly distributed about the center of rotation and hence a desired rolling action is obtained. Such ballast, being carried directly by the rim, does not place a dead load on the axle and axle bearings and hence these parts will not be strained. If a tire is punctured or blows out the ballast will not be lost or damaged.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
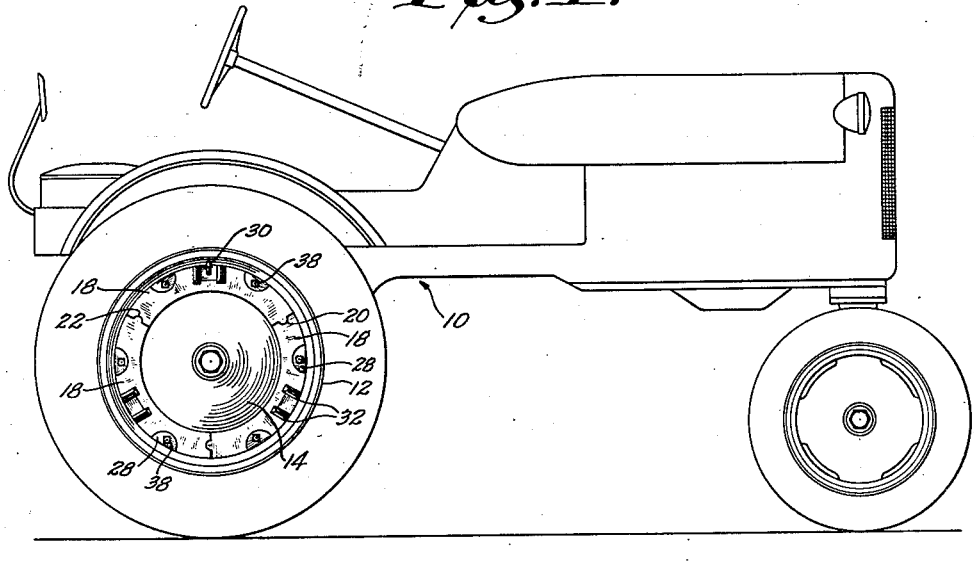
Fig. 1 is a view in side elevation of a tractor having installed on the traction wheels thereof detachable ballast embodying the present invention.
Figure 3:
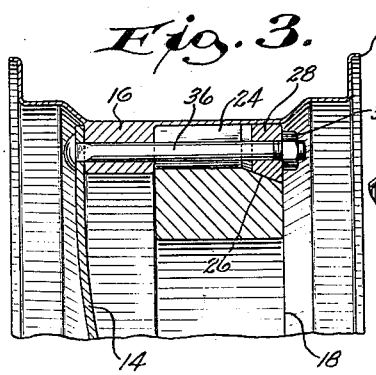
Fig. 3 is a fragmentary sectional view taken on line 3—3 of Fig. 2.
Figure 2:
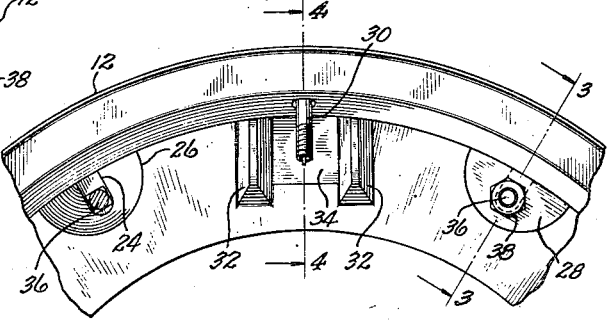
Fig. 2 is an enlarged fragmentary view in side elevation of one of the segmental weights comprising part of such detachable ballast, one of the locking lugs being removed for sake of clarity in illustration.
Figure 4:
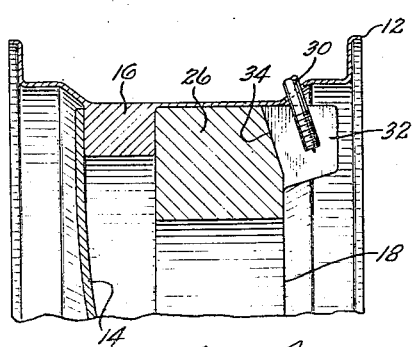
Fig. 4 is a fragmentary sectional view taken on line 4—4 of Fig. 2.
Figure 5:
Fig. 5 is a perspective view of an attaching lug comprising one of the elements of this invention.

Referring to the drawings by reference numerals, the detachable ballast comprising this invention is shown installed on a farm tractor 10 although such ballast may be used on any traction wheel having space within the rim thereof. While the rear wheels of farm tractors of different manufacture vary in their construction, the ballast herein described need only be changed dimensionally to make it attachable to the rear wheels of other types of farm tractors. In its inventive essence the detachable ballast herein described will be the same for any traction wheel provided with a demountable rim. Most tractors have a demountable rim 12 which is secured by standard rim bolts to the periphery of the traction wheel 14, such demountable rim usually having an internal flange 16 which abuts against the peripheral margin of the wheel 14 and is secured thereto by rim bolts passing through openings in both such members. In most tractors the internal flange 16 is offset from the central plane of the rim so that the rim may be reversed to adjust the tractor tread for various row spacing.

The detachable ballast of this invention is carried within the confines of the demountable rim 12 where the weight thereof will be applied directly against the rim and tire and thus avoid placing extra loads on the axle and axle bearings. The ballast consists of three segmental weights 18 each of identical shape and of proper length so that when assembled in end-to-end relationship they form a complete ring. A ballast of approximately two hundred and twenty-five pounds for each wheel is sufficient to provide the desired ground-gripping traction. By using three segmental weights, each weighing seventy-five pounds, the ballast may be easily installed or detached. It is, however, within the scope of this invention to use more than three segmental weights and thus lessen their unitary weight. Each of the segmental weights are identical and only one will be described. The weights may be inexpensively manufactured by casting them of iron although other metals and other methods of making the desired shape may be used. One end of the segmental weight has a transversely extending projecting tongue 20 and the other end has a transversely extending groove 22 which is complementally shaped with respect to the tongue 20 so that when the weights are assembled to form a ring the tongue 20 of one weight fits within the recess 22 of an adjacent weight to aid in locking the weights in such ring. The segmental weight 18 has a pair of slots 24 in its outer surface extending transversely thereof. These slots are angularly spaced in conformity with the angular spacing of the rim bolt openings in the internal flange 16 and amply accommodate an elongated rim bolt 36 used in securing the weight in place. The outer ends of the slots 24 terminate in frusto-conical recesses 26 which receive complementally shaped fastening lugs or wedges 28. It has been found desirable to provide the segmental weight with a valve stem protector which consists of a pair of spaced laterally projecting flanges 32 adjacent the edges of an inwardly sloping notch 34. The notch insures that the weight 18 will not ride against the valve stem 30 and provides room for assembly while the flanges protect the valve stem from contact with rocks, gravel, and like material, during operation.

To assemble the ballast the tractor wheel 14 is positioned so that the valve stem 30 is substantially directly below the hub. Then the two standard rim bolts adjacent opposite sides of the valve stem 30 are removed and in their place are inserted the elongated bolts 36. These bolts are headed and have squared locks which fit within squared openings in the wheel 14 to prevent rotation of said bolts. One of the segmental weights 18 is then placed on the inner surface of the rim 12 with the slots 24 fitting over the bolts 36. The action of gravity will keep the weight 18 in proper place while the lugs 28 are inserted over the bolts 36 and slid into the recesses 26. At this time the nuts 38 are drawn up just enough to place the lugs under slight pressure. The tractor wheel is then rotated approximately sixty degrees to bring an end of the weight then installed under the hub. A second weight is then installed in the same manner as described for the first weight with the tongue 20 fitting in the recess 22. The third weight is then installed without changing the position of the tractor wheel. It will be held in place, while being secured as described, by its ends resting on the ends of the weights already installed. When all three of the weights are installed and the ring completed, the nuts 36 are drawn down tight jamming the lugs 28 into the recesses 26 and against the inner surface of the rim 12. This forces each of the weights inwardly and locks their ends to make a rigid ring and draws each weight tightly against the internal flange 16, thereby solidly mounting the ballast within the wheel.

Although only one embodiment of the invention is shown and described herein, it will be understood that this application is intended to cover such changes or modifications as come within the spirit of the invention or scope of the following claims.

I claim:
1. The combination with a traction wheel having a demountable rim and angularly spaced holes for rim bolts, of a plurality of arcuately shaped weights consisting of segments of a ring placed in end-to-end abutment and forming a ring within the confines of said rim, slots in the circumference of said weights, each terminating in a semi-frustoconical recess, bolts in said holes passing through said slots, semi-frustoconical wedges on said bolts received in said recesses and bearing against said rim, and nuts on said bolts holding said wedges in pressure engagement.

2. The combination with a traction wheel having a demountable rim with casing and tube, said tube having a valve stem projecting radially inwardly of said rim, of a plurality of arcuately shaped weights consisting of segments of a ring placed in end-to-end abutment and forming a ring within the confines of said rim, means locking said weights to said rim, a sloping notch in the circumference of one of said weights, and a pair of spaced flanges adjacent the edges of said notch and projecting laterally of said weight, said valve stem being between said flanges whereby said stem is protected from contact with damaging objects during operation of said wheel.

3. Detachable ballast for traction wheels having demountable rims and rim bolt holes, comprising a plurality of arcuately shaped weights consisting of segments of a ring each individually installed within the confines of said rim in end-to-end abutment to form a completed ring, slots in the circumference of said weights, each terminating in a sloping recess adapted to have camming action with a wedge, bolts in said holes passing through said slots, tapered wedges on said bolts received in said recesses and bearing against said rim, and nuts on said bolts holding said wedges in pressure engagement.

4. The combination with a traction wheel having a demountable rim with casing and tube, said tube having a valve stem projecting radially inwardly of said rim, of a plurality of arcuately shaped weights consisting of segments of a ring placed in end-to-end abutment and forming a ring within the confines of said rim, means locking said weights to said rim, a sloping notch in the circumference of said ring, and a pair of spaced flanges adjacent the edges of said notch and projecting laterally of said weight, said valve stem being between said flanges whereby said stem is protected from contact with damaging objects during operation of said wheel.

WALTER H. ROLOFF.

REFERENCES CITED

The following references are of record in the file of this patent:

UNITED STATES PATENTS

| Number | Name | Date |
| --- | --- | --- |
| 1,263,375 | Clarke | Apr. 23, 1918 |
| 1,589,915 | Whitehead | June 22, 1926 |
| 1,957,338 | Hecht et al. | May 1, 1934 |
| 2,090,870 | Kay | Aug. 24, 1937 |
| 2,307,096 | Zink et al. | Jan. 5, 1943 |